March 28, 1950     J. E. SZITAR     2,502,290
ASSEMBLY OF END CAPS AND CYLINDERS
Filed June 7, 1946
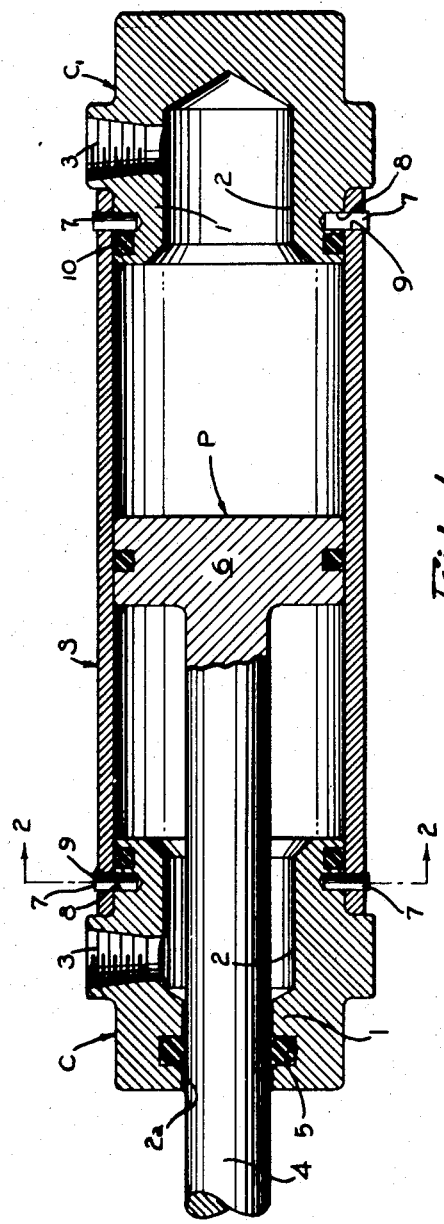
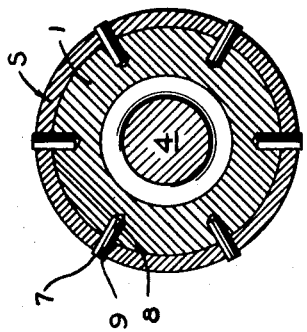
INVENTOR.
JOHN E. SZITAR
BY Richey & Watts
ATTORNEYS Patented Mar. 28, 1950

2,502,290

UNITED STATES PATENT OFFICE 2,502,290

ASSEMBLY OF END CAPS AND CYLINDERS

John E. Szitar, Cleveland Heights, Ohio, assignor to The Weatherhead Company, Cleveland, Ohio, a corporation of Ohio Application June 7, 1946, Serial No. 675,267

2 Claims. (Cl. 309—2)

This invention is directed to the assembly of hydraulic cylinders, more specifically to novel means for attaching end caps or heads of cylinders to the cylinder wall member to provide a light-weight fluid-tight joint.

In many installations, notably in aircraft work, the provision of structure which combines light weight with adequate structural strength is of vital importance. For example, modern aircraft equipment includes numerous hydraulic cylinders and it is highly desirable that these be made as light as possible consistent with an adequate factor of safety.

For example, a section of drawn seamless tubing of a given wall thickness is stronger than a tube of the same thickness which has one or both of the surfaces threaded, the threaded section of the tubing always being weakest unless that section is made thicker than the balance of the tubing. If this is done, considerations of weight usually require that the unthreaded portions of the tubing be turned down. This turning down of the unthreaded portions of the tube cuts through the work hardened strong skin of the metal and, furthermore, if toolmarks are present the tube is weakened materially. If the tube is not turned down in the unthreaded portions, then the unthreaded portion of the wall will be unnecessarily thick, the weakest portion of the tubing being at the threads. It is an object of the present invention to provide a cylinder in which the cylinder wall is made of tubing of uniform thickness and attached to the end caps in such a manner that no threading or turning operations need be performed on the cylinder wall and no excess of metal need be provided anywhere along the cylinder wall. Briefly, this object is accomplished by radially drilling a plurality of holes adjacent the end of a plain tubular cylinder member and an aligned series of recesses in the cylinder cap member and pressing small retaining pins into the drilled apertures, the number of pins and their size being selected to give the required axial strength to the assembly. A fluid-tight seal is obtained by including a suitable sealing member in the assembly.

Cylinder assemblies of the prior art have been formed so that not only must the cylinder bore which receives the piston and end caps be accurately finished internally but additional finishing and machining operations have been required externally of the tube to provide fastening means for the end caps and in some cases to cut down on excess weight of the cylinder itself. It is a further object of my invention to eliminate the need for any accurate finishing of the external wall of the cylinder and so restrict all accurate finishing to the interior wall engaged by the piston. The pinned end cap construction accomplishes this result.

These and other objects of my invention will be apparent as the following detailed description thereof proceeds.

In the drawings:

Fig. 1 is a sectional view of the cylinder assembly; and

Fig. 2 is a cross section taken along 2—2 of Fig. 1.

Referring to Fig. 1, the cylinder wall or sleeve member S has mounted therein a pair of end caps C and $C_1$ and piston P slides within the cylinder thereby formed. Each cylinder end cap has an annular sleeve portion 1 formed by a bore 2 which extends partially through the cap. The cylinder cap C, which receives the piston rod 4, has another bore $2a$ to receive the piston rod and that cylinder cap likewise has a seal 5 to seal the rod against fluid pressure. Each cylinder cap may be provided with an outlet port 3 to communicate with the interior of the cylinder. The piston 6 can be formed in any convenient manner for working against the wall of the cylinder sleeve S. The cylinder sleeve is drilled or apertured radially as at 9 and the corresponding number of recesses or apertures 8 are formed in each cap member. A plurality of retaining pins 7 are pressed into the aligned apertures 8 and 9 to retain the cylinder caps and the cylinder sleeve together. Each cap may be provided with a sealing member as at 10 of any convenient design to insure a fluid-tight seal. The number and diameter of the pins 7 are selected so that the assembly will have the required strength and will successfully resist axial forces tending to expel the caps from the member S.

It can be seen with this construction the cylinder tube member S can be made of seamless tubing of the proper wall thickness for the loads at hand and need not be subjected to threaded operations which either weaken the structure adjacent the threads materially, or which require an excessive wall thickness adjacent the threads. As has been mentioned before, in aircraft work, if extra wall thicknesses are provided adjacent the threads, the intermediate portion of the sleeve is often turned down to save weight. This breaks the skin of the metal and makes it much weaker than a plain tube like that permitted by applicant's novel construction.

Various modifications may be made; for example, the cylinder could be single acting in which case the end cap C would be omitted. Although I have illustrated the conventional O-ring sealing members, I contemplate that any suitable fluid seal may be substituted therefor. The size and number of pins 7 may be varied to suit the conditions and load encountered in service. These and other modifications may be made without departing from the spirit of the invention as defined in the appended claims.

Having thus described the present invention so that others skilled in the art may be able to understand and practice the same, I state that what I desire to secure by Letters Patent is defined in what is claimed.

What I claim is:

1. In a cylinder, a tubular cylinder wall member, a cylinder cap member having a portion telescoped within said wall member, a plurality of aligned radial apertures in the telescoped parts of said members, retaining pins pressed into said apertures, and an annular groove in the telescoped portion of said cap member, a rubber-like sealing member disposed in said groove, said sealing member cooperating with the inner wall of said cylinder member to form a fluid-tight joint by radial pressure against said cylinder wall, said retaining pins resisting separation of the cap and cylinder wall member by strain in shear.

2. In a cylinder, a tubular cylinder wall member, a cylinder cap member having a portion telescoped within said wall member, a plurality of aligned radial apertures in the telescoped parts of said members, retaining pins pressed into said apertures, and an annular groove in the telescoped portion of said cap member, and an O-ring sealing member disposed in said groove, said sealing member cooperating with said inner wall of said cylinder member to form a fluid-tight joint by radial pressure against said cylinder wall, said retaining pins resisting separation of the cap and cylinder wall member by strain in shear.

JOHN E. SZITAR.

REFERENCES CITED

The following references are of record in the file of this patent:

UNITED STATES PATENTS

| Number | Name | Date |
|---|---|---|
| 604,371 | Cook | May 24, 1898 |
| 937,437 | Halstead et al. | Oct. 19, 1909 |
| 1,248,808 | Christofferson | Dec. 4, 1917 |
| 1,447,963 | Coleman | Mar. 13, 1923 |
| 2,245,151 | Martinet | June 10, 1941 |
| 2,352,382 | Hendricks | June 27, 1944 |
| 2,390,445 | Mercier | Dec. 4, 1945 |
| 2,410,808 | Christensen | Nov. 12, 1946 |